Figure 1:
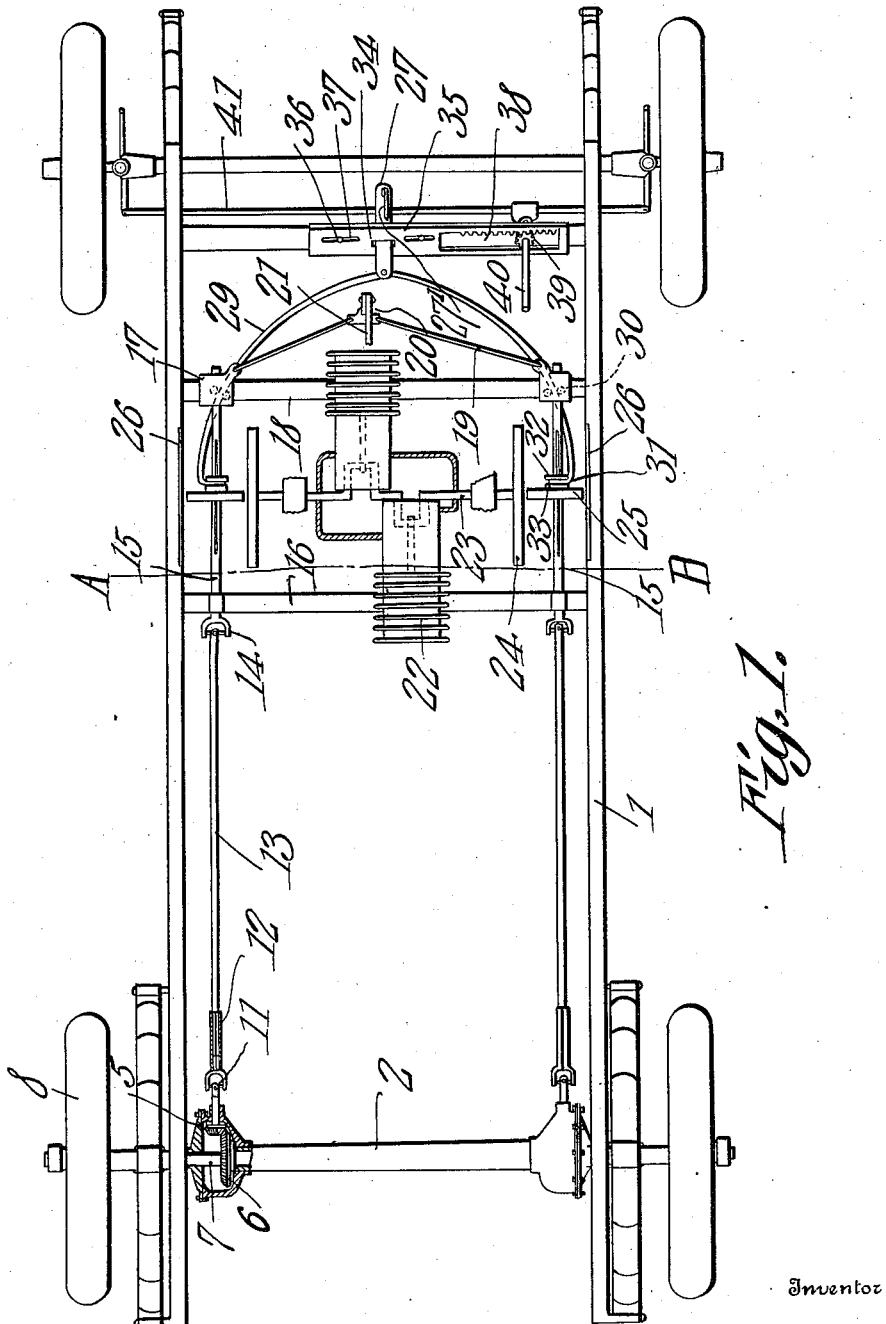

B. E. BYRD.
MOTOR VEHICLE.
APPLICATION FILED OCT. 15, 1909. RENEWED NOV. 25, 1911.

1,014,808.

Patented Jan. 16, 1912.

2 SHEETS—SHEET 1.

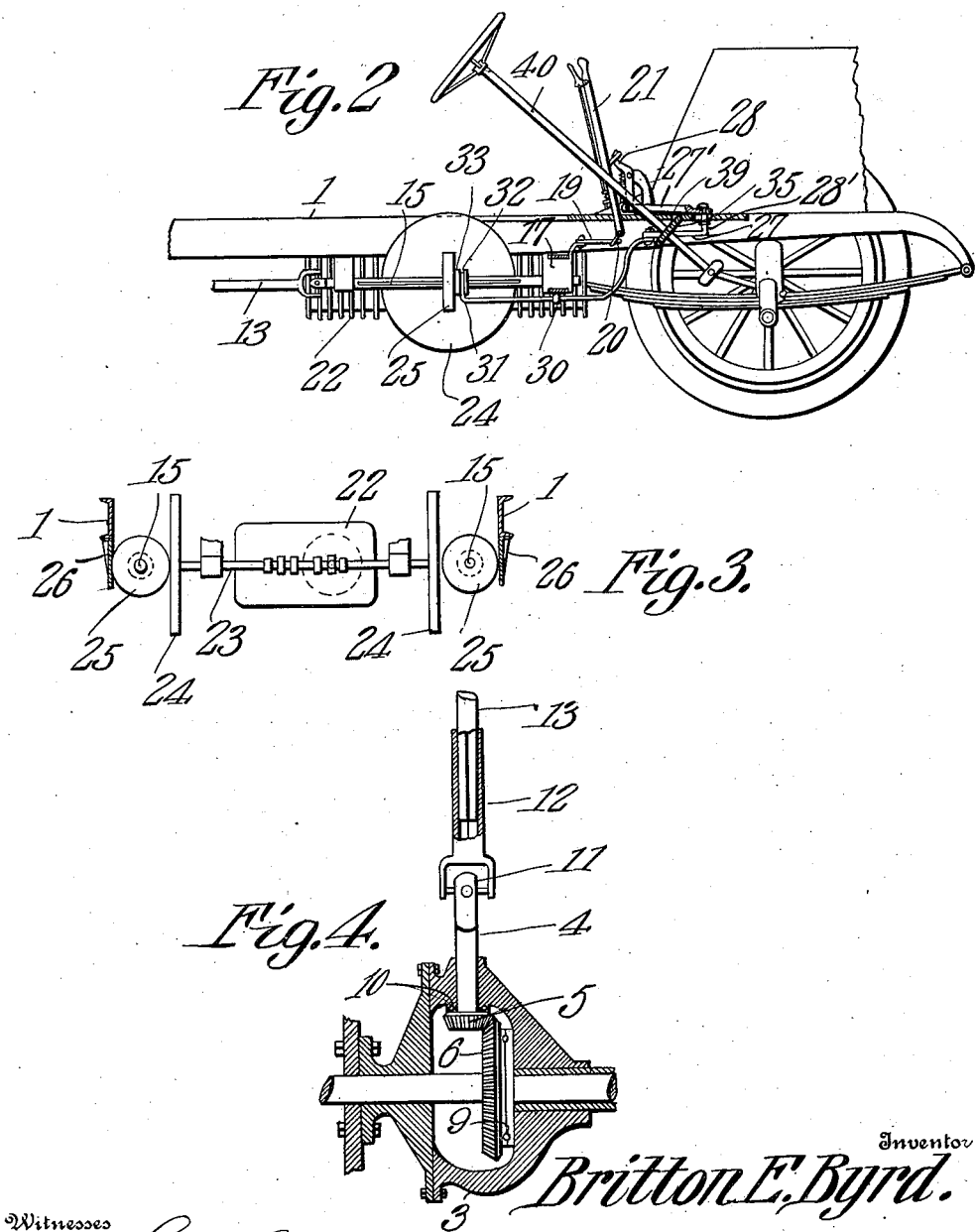

UNITED STATES PATENT OFFICE.

BRITTON E. BYRD, OF DURHAM, NORTH CAROLINA.

MOTOR-VEHICLE.

1,014,808. Specification of Letters Patent. Patented Jan. 16, 1912.

Application filed October 15, 1909, Serial No. 522,809. Renewed November 25, 1911. Serial No. 662,468.

*To all whom it may concern:*

Be it known that I, BRITTON E. BYRD, a citizen of the United States, residing at Durham, in the county of Durham and State of North Carolina, have invented a new and useful Motor-Vehicle, of which the following is a specification.

This invention relates to driving mechanism for automobiles and one of its objects is to provide simple means whereby the disks can be shifted to vary the speed and to change the direction of rotation of the drive wheels.

Another object is to provide separate driving mechanism for each of the rear wheels of the vehicle, means being provided for varying the speed of the said wheels, this means being under the control of the steering mast.

One of the objects of the present invention is to provide means whereby the separate driving mechanisms will be automatically shifted while the machine is traveling on a curve so as to increase the speed of the outer drive wheel of the vehicle, at the same time reduce the speed of the inner drive wheel, thus equalizing the power upon the two wheels and maintaining it constant under all conditions.

With these and other objects in view the invention consists in certain novel details of construction and combinations of parts hereinafter more fully described and pointed out in the claims.

In the accompanying drawings the preferred form of the invention has been shown.

In said drawings, Figure 1 is a plan view of the running gear of an automobile having the present improvements applied thereto, certain of the housings of the mechanism being shown in section. Fig. 2 is a side elevation of the driving mechanism and the steering gear, the chassis being broken away. Fig. 3 is a vertical transverse section on the line A—B Fig. 1, one of the cylinders of the engine being indicated by dotted lines. Fig. 4 is an enlarged horizontal section through a portion of the rear axle and showing the mechanism employed for transmitting motion thereto from the main power transmitting shaft.

Referring to the figures by characters of reference, 1 designates the main frame or chassis of the automobile, the frame being provided at its rear end with a stationary axle 2 supported at its ends by housings 3 connected to the frame. The said housings constitute bearings for shafts 4, each of which has a bevel gear 5 upon one end thereof, and located within the housing, said gear meshing with a larger gear 6 which is also located in the housing and is secured to a revoluble axle section 7. This axle section is journaled within the housing and projects beyond the frame or chassis there being an ordinary wheel 8 secured to the axle section at its outer end while the inner end of said section projects into the fixed axle 2. Ball bearings 9 are interposed between the gears 6 and the adjoining faces of the housings 3 and additional anti-friction bearings 10 are interposed between the gears 5 and the adjoining faces of the housings.

Each shaft 4 is connected by means of a universal joint 11, with a sleeve 12 which is angular in cross section, this sleeve being slidably mounted upon the angular end portion of an intermediate drive shaft 13. Said drive shaft extends parallel with one side of the frame 1 and is connected by means of a universal joint 14 with a shaft section 15. This shaft section is journaled adjacent one end in a cross bar 16 and is adapted to swing laterally in said bar while its other end is similarly mounted within a slide 17 mounted to move transversely of the frame and upon a guide bar 18 carried by said frame. It is of course to be understood that one of these shafts 15 and the parts connected thereto is located adjacent each side of the frame and the two slides 17 are connected, preferably by means of links 19, with a slide 20. A lever 21 is connected at its lower end to the slide, this lever being located adjacent the driver's seat so that it can be readily manipulated for the purpose of forcing the slide 20 either forward or backward. Obviously when the slide is shifted forwardly, the slides 17 will be drawn toward each other along the bar 18 and when the movement of the lever 21 is reversed, said slides 17 will be shifted away from each other along said bar 18.

The motor 22 is located between the shafts 15 and the drive shaft 23 of the motor is provided, at each end, with a fly wheel 24 in the form of a friction disk. These disks 24 are designed to be frictionally engaged by driven friction disks 25 feathered on the shafts 15. Friction strips 26 of any suitable material are secured upon the inner faces of the sides of frame 1 and in the paths of the disks 25, these strips constituting the brake element as will be hereinafter set forth.

An elongated slide 27 is movable longitudinally upon the front portion of the chassis and has an upstanding front portion 28' which is pivotally connected by a link 27' to the lower end of a foot lever 28 whereby the slide can be shifted longitudinally either forwardly or backwardly. Curved operating rods 29 are pivotally connected to the rear end of the slide 27 and work between guides 30 extending downwardly from the bar 18, the rear end of each of these rods 29 being forked as at 31 and engaging the annularly grooved portion 32 of a sleeve 33 extending from one of the disks 25. It will be apparent therefore that when the slide 27 is shifted longitudinally in either direction, by means of the foot lever 28, the rods 29 will produce a corresponding movement of the friction disks 25 upon the shaft 15.

Slide 27 extends through a slot 34 formed within a transversely extending slide 35, the last mentioned slide being supported by guide pins 36 extending through elongated slots 37 therein. The said slide 35 has a rack 38 thereon, this rack being engaged by a gear 39 which is mounted on and rotates with the steering mast 40. The said mast is designed to actuate the steering gear 41 of the usual or any preferred construction and it will be apparent that when the mast is turned for the purpose of shifting the steering gear, the gear 39 will produce a longitudinal movement of the rack 38 and slide 35, thus causing the slide 27 to swing about the pivot connecting it with the foot lever 28. This swinging movement of slide 27 will cause one of the rods 29 to push against the disk 25 to which it is connected while the other rod 29 will pull upon the other disk 25. The two disks will thus be simultaneously shifted in opposite directions.

During the operation of the motor 22 the shaft 23 and the main driving disks 24 will of course be rotated and the vehicle will remain at a standstill provided the disks 25 bear against the centers of the disks 24 or are entirely out of contact with said disks or are in contact with the brake strips 26.

When it is desired to start the vehicle the disks 25 are first shifted against the centers of the disks 24 by means of the hand lever 21 which operates to pull upon the links 19 and thus shift the slides 17 toward each other. The foot lever 28 is then actuated so as to shift slide 27 longitudinally and disks 25 will therefore be drawn away from the centers of the disks 24 and will be rotated thereby, the speed of the rotation increasing in proportion to the distance of the disks 25 from the centers of the disks 24. Shafts 15 will therefore be rotated and motion transmitted therefrom through the shafts 13 and sleeves 12 to the short shafts 4 and the gears carried thereby. Gears 5 will drive the gears 6 and the rear wheels of the vehicle will therefore be rotated. Should it be desired, at any time, to bring the machine to a sudden stop, it becomes merely necessary to reverse the movement of the lever 21 so as to move the slides 17 away from each other and thus shift the disks 25 out of contact with the disks 24 and against the brake strips 26. The frictional engagement of the rotating disks 25 with the stationary strips 26 will, obviously, bring the machine to a quick stop. The sudden stopping of the vehicle can also be effected by quickly shifting the disks 25 across the centers of the disks 24 by means of the foot lever 28, the said disks 24 and 25 remaining in contact.

While the machine is traveling along a straight course the power will be equally distributed to the two wheels 8 of the vehicle. When it is desired to turn the car however the mast 40 is rotated as usual and this causes not only the front wheels to turn but also shifts the slide 35 longitudinally and causes the slide 27 to swing upon its pivot. Rods 29 will therefore shift the disks 25 in opposite directions, the disk which drives the inner wheel 8 being shifted toward the center of the drive disk 24 while the disk which drives the outer wheel 8 is moved toward the periphery of the disk 24. It will thus be seen that the power transmitted to the inner wheel is increased in proportion to the decrease of power transmitted to the outer wheel 8 and obviously the power is thus equalized under all conditions and it does not become unevenly distributed as where the ordinary type of differential gears are utilized.

It will be seen that the mechanism herein described is simple in construction, and will not readily get out of order because the number of working parts is reduced to the minimum.

Importance is attached to the simple means for stopping the vehicle, this being practically instantaneous with the disconnection of the drive axle from the drive disks 24.

What is claimed is:

1. A motor vehicle including separately revoluble drive wheels, a motor, drive disks actuated by said motor, friction gears driven by the disks, separate means for transmitting motion from said gears to the respective wheels, a longitudinally movable pivoted slide, connections between said slide and the gears for simultaneously shifting the gears in one direction, means for actuating the slide, a steering mast, and means actuated by said mast for shifting the slide about its pivot to move the gears simultaneously in opposite directions.

2. In a motor vehicle the combination with drive friction disks, of friction gears actuated thereby, a pivotally supported slide, means actuating the same, connections between the slide and gears for simultaneously shifting the gears in the same direction upon the working faces of the disks, a revoluble steering mast, a gear thereon, a rack meshing with the gear, a slide movable with the rack, the first mentioned pivoted slide projecting through and being actuated by the slide of the rack to simultaneously shift the gears in opposite directions.

In testimony that I claim the foregoing as my own, I have hereto affixed my signature in the presence of two witnesses.

BRITTON E. BYRD.

Witnesses:
WILL MARKHAM,
M. G. MARKHAM.

Copies of this patent may be obtained for five cents each, by addressing the "Commissioner of Patents, Washington, D. C."